June 18, 1929.  C. FAYER  1,717,500
SYNCHRONOUS MOTOR
Filed May 14, 1925  2 Sheets-Sheet 1
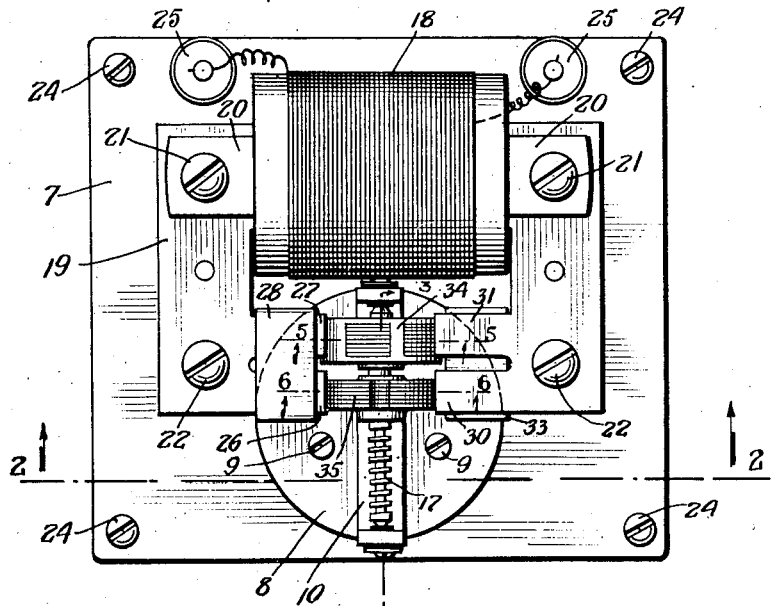
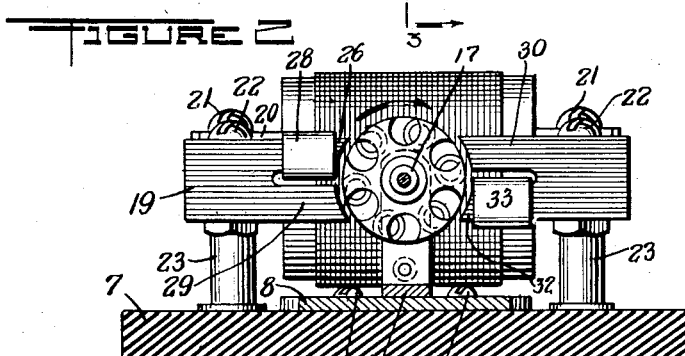
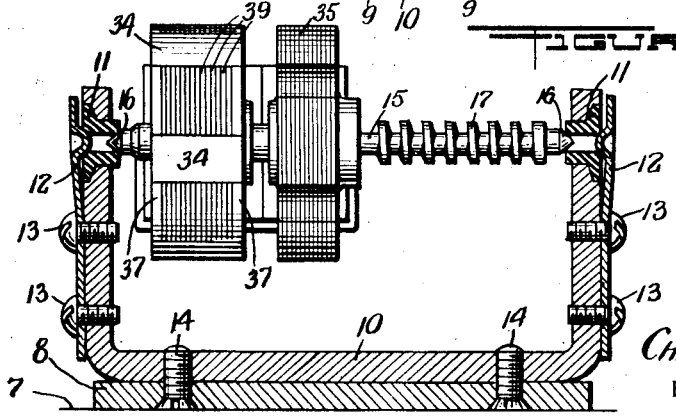
INVENTOR
CHARLES FAYER
BY Walton Harrison
ATTORNEY

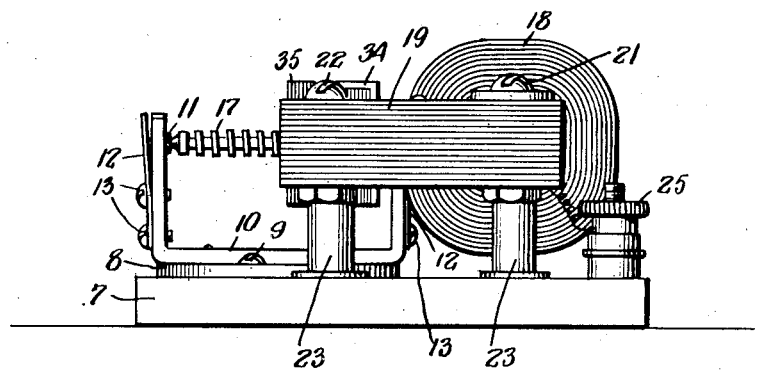

Patented June 18, 1929.

1,717,500

UNITED STATES PATENT OFFICE.

CHARLES FAYER, OF FLUSHING, NEW YORK, ASSIGNOR TO WAPPLER ELECTRIC COMPANY, INC., A CORPORATION OF NEW YORK.

SYNCHRONOUS MOTOR.

Application filed May 14, 1925. Serial No. 30,174.

My invention relates to synchronous motors of the general type exemplified by the motor described in my pending application filed May 2, 1924, Serial No. 710,534, for patent upon a self-starting synchronous induction motor.

More particularly stated, I seek to produce a motor of the type just mentioned and having a squirrel cage armature, but in which the synchronism is refined and in which the working efficiency is improved to a considerable extent.

The synchronous motor described in my pending application above mentioned starts into action easily by itself whenever the current is turned on, and promptly acquires a speed in synchronism with the alternating current, whereby it is driven. However, it has occasionally happened that with a load upon the motor, if the armature stopped in a certain position relatively to the field, the motor failed to start when the current was turned on.

The fault just mentioned is completely overcome in my present invention, my new motor being positively self-starting under any reasonable conditions of load. My motor also readily developed a considerable amount of mechanical power for a given supply of electrical energy.

These considerations are of great importance in a synchronous motor in which there is required absolute certainty of starting under different conditions, and in which the armature must be speeded up quickly to synchronism.

My invention is well adapted for use with electric clock systems of the kind in which clocks are provided with synchronous motors actuated by currents from a master station, and in which low power consumption and the absence of undue heating are important factors.

Reference is made to the accompanying drawing forming a part of this specification, and in which like reference characters indicate like parts throughout the several figures.

Figure 1 is a plan view of my synchronous motor.

Figure 2 is a section on the line 2—2 of Figure 1, looking in the direction indicated by the arrows.

Figure 3 is a section on the line 3—3 of Figure 1, looking in the direction indicated by the arrows.

Figure 4 is an end elevation of mechanism shown in Figure 1.

Figure 5 is a section on the line 5—5 of Figure 1, looking in the direction indicated by the arrows.

Figure 6 is a section on the line 6—6 of Figure 1 looking in the direction indicated by the arrows.

A base plate 7, made of insulating material, is used to support various other parts and serves generally as the base of the motor.

Mounted upon the base plate 7 is a metallic supporting disk 8, held in position by screws 9 which extend into the base plate.

A yoke 10, made of metal and having substantially a U-shaped form in cross section as indicated in Figure 3, is supported by the supporting disk 8 and carries a pair of bearings 11, made of insulating material such as hard rubber and each having the form of a sleeve, as indicated in Figure 3.

Engaging the bearings 11 are leaf springs 12, secured by screws 13, 13 to the upwardly extending portions of the yoke 10. This yoke is held fixedly in position upon the supporting disk 8 by means of screws 9, as indicated by Figure 2. The leaf spring 12 presses gently against the bearings 11 and takes up lost motion between these bearings and the armature shaft 15, which is revolubly supported upon these bearings. The armature shaft 15 is provided with conical ends 16, which extend into the adjacent end portions of the bearings, in consequence of gentle pressure 25 by the leaf springs 12, so that undue lost motion in the armature shaft 15 is taken up, or reduced to a minimum.

The armature shaft 15 is provided with a worm 17, from which power is transmitted to any machinery to be driven by the motor.

The field winding of the motor appears at 18, and the field core at 19. This field core is of substantially C-form, as may be understood from Figure 1, and is laminated, and preferably provided with a removable plate 20 of soft iron, held in position by screws 21. The purpose in having the plate 20 removable is to facilitate adjustment of the winding 18, upon the field 19.

Bolts 22 extend through the field magnet 19, and engage posts 23 of non-magnetic material. The bolts 21 also engage these posts, of which there are four, and upon these four posts are supported the field magnets and parts carried thereby.

Corner screws 24 extend through the base plates 7, and are used to hold the same in position upon a table or other supporting surface. A pair of binding posts 25, 25 are connected with the winding 18 and used for supplying current thereto, for the purpose of driving the motor.

The field magnet 19 has its pole pieces split, as may be understood from Figures 1 and 2, and thus divided into a number of pole shoes of small size. Two of these pole shoes 26 and 27 are together encircled by a single self-closed band 28 of metal of low resistance, preferably copper, and below these pole shoes 26 and 27 are two others 29.

Opposite the pole shoes 26 and 27, and of course facing the armature shaft from the opposite direction, are two pole shoes 31. Below these and opposite the pole shoes 26 and 27 are two pole shoes 30, which are encircled by a single self-closed band 33 of copper or other metal of low resistance. The two bands 28 and 33 thus staggered relatively to each other, as may be understood from Figure 2.

Fixed upon the armature shaft 15 and thus revoluble therewith are two separate and distinct armatures 34 and 35, differing in kind and located close together.

The armature 34 is a squirrel cage rotor and is somewhat similar to the armature of the motor described in my pending application above mentioned.

The squirrel cage rotor 34 carries a number of short copper conductors 36, each of tubular form and extending entirely through the armature in a direction parallel with the axis of rotation. These tublar conductors 34 are at their ends connected with a pair of disks 37, made also of copper. Intermediate the disks 37 the remaining portions of the armature are made of soft iron and laminated, as may be understood from Figure 3.

Preferably the copper parts of the armature 34 are welded, brazed, or soldered, into a single body which is practically integral throughout.

The armature 35 is relatively simple in construction, and comprises a hub member 38 carrying a number of disks 39 of soft iron, integrally connected, so as to constitute a laminated body having the general form of a multilated disk, the multilations being shown at 40 in Figure 6 and being preferably made by drilling holes through the disk armature so as to graze the outer edge thereof; the intermediate portions, in this instance six in number, being thus virtually formed into as many pole pieces.

The essential difference in construction between the armatures 34 and 35 is that the tubular conductors 36 and the disks 37, though present in the armature 34 as above described, are missing altogether from the armature 35. This means in effect that in the armature 34 each of the six pole pieces is practically encircled by a self-closed loop of metal of good conductivity, and which readily becomes a good field for the flow of eddy currents.

In other words the tubular conductors 36 and the two disks 39 together constitute a complete squirrel cage rotor which acts as if insulated from the iron portions of the armature 34 and is constantly energized by heavy currents of low electromotive force while the motor is in action. Since these currents have more or less persistency, they render the armature 34 sluggish in acquiring and and losing its magnetism as compared with the armature 35. It necessarily follows that there is a tendency for the two armatures to be at all times slightly displaced in phase with each other, and on this account some torque is always present whenever the field magnets are energized.

The squirrel cage rotor 34 is so positioned as to be faced in one direction by the pole shoe 27 and one of the pole shoes 29, and also to be faced in the opposite direction by the pole shoe 31 and one of the pole shoes 32. Somewhat similarly, the disk armature 35 is so positioned as to be faced in one direction by the pole shoe 26 and one of the pole shoes 29, and also to be faced in the opposite direction by the pole shoe 30 and one of the pole shoes 32.

The poles of the disk armature 35 are angularly displaced to a very slight extent relative to the poles of the squirrel cage rotor 34, as indicated by full and broken lines in Figures 2, 5 and 6. The nature of this displacement may be understood by imagining that after placing the disk armature and the squirrel cage rotor upon the shaft, the squirrel cage rotor had been fixed in position, and the disk armature had been brought into such position that each of its mutilations 40 was in exact registry with some one of the tubular conductors 36; and that when the disk armature had been rotated very slightly in a counter-clockwise direction according to Figures 2, 5 and 6, and then fixed in position upon the shaft. The extent of the angular displacement may be varied as hereinafter explained, but in instances where each armature has six pole pieces, is preferably about twenty degrees; that is, one-eighteenth of a complete turn. This angular displacement is equal to one-third of the angular distance from center to center of any two consecutive pole pieces of either armature.

The armature shaft and the armatures carried thereby rotate in a clockwise direction according to Figure 2 while the motor is in action.

In practice I prefer to make pole shoes in their entirety rather wide, in order to adapt them for use with the two armatures, which together have an aggregate width greater than that of a single armature of ordinary construction. In practice I make the aggregate width of the pole pieces about double the width I would provide for a single armature of the type of a squirrel cage rotor, other conditions being equal.

In each of the two armatures the laminæ extend perpendicular to the axis of the armature shaft.

The angular displacement of the disk armature 35 relatively to the squirrel cage rotor 34 as above described may be varied within reasonable limits for any individual armature, as well as for different conditions of load and different characteristics of the alternating currents used. There is usually a single point, to be found by trial, at which the angular displacement is most effective. That is to say the operator, by trying different degrees of displacement as between the two armatures, can find for any individual motor or for any given condition of load, current, etc. a certain angular displacement at which the aramature behaves at its best, as above explained. When this point is discovered and the two armatures adjusted accordingly, the motor starts up without fail no matter in what position the armature may be at the start, and jumps into synchronous speed the instant the current is turned on.

It appears that the disk armature 35 is brought to its maximum magnetization, or to any predetermined degree of magnetization, more quickly than is the case with the squirrel cage rotor 34, and that the disk armature 35 also loses its magnetization more quickly. Owing to this fact, there appears to arise a certain amount of torque in addition to such torque as the squirrel cage rotor might otherwise develop if used alone. In any event the two armatures 34 and 35, mounted together upon the same shaft and displaced angularly to a very slight extent relatively to each other, have been found by trial to develop instantly and with certainty a considerable torque, greater in degree than would ordinarily be expected from an ordinary squirrel cage armature of substantially the same size, and also to develop this torque to the maximum attainable so quickly that no perceptible period of delay takes place after the current is turned on and before the armature begins to rotate synchronously and at full speed.

Moreover, this additional torque increases the efficiency of the motor generally, and also by avoiding waste of power incidental to starting the motor into action. This motor is unusually efficient as compared with other motors of the same size.

While my improved motor may be made upon either a large scale or a small scale, it is peculiarly adapted for a small scale, and can readily be made up in commercial form, substantial and durable, so as not to weigh more than one or two pounds.

I find that the motor operates to the best advantage if the armatures each contain six pole pieces, or if the pole pieces number in the aggregate some multiple of six.

I do not limit myself to the precise mechanism shown, as variations may be made therein without departing from my mechanism, the scope of which is commensurate with my claim.

I claim:

A single phase induction-synchronous motor comprising a primary member having means for producing a strongly pulsating, shifting, magnetic field, and a secondary member carrying a disk armature and a squirrel cage armature, the poles of the disk armature being slightly displaced relatively to the poles of the squirrel cage armature, the squirrel cage armature having windings each composed of conductors of such cross section as to give the secondary member a salient pole effect.

Signed at Long Island City, in the county of Queens and State of New York, this 14th day of April, 1925.

CHARLES FAYER.